Dec. 26, 1944.     L. H. HOWE     2,365,759
LATHE AND SHAPER TOOLBIT GRINDING GAUGE
Filed Dec. 23, 1942
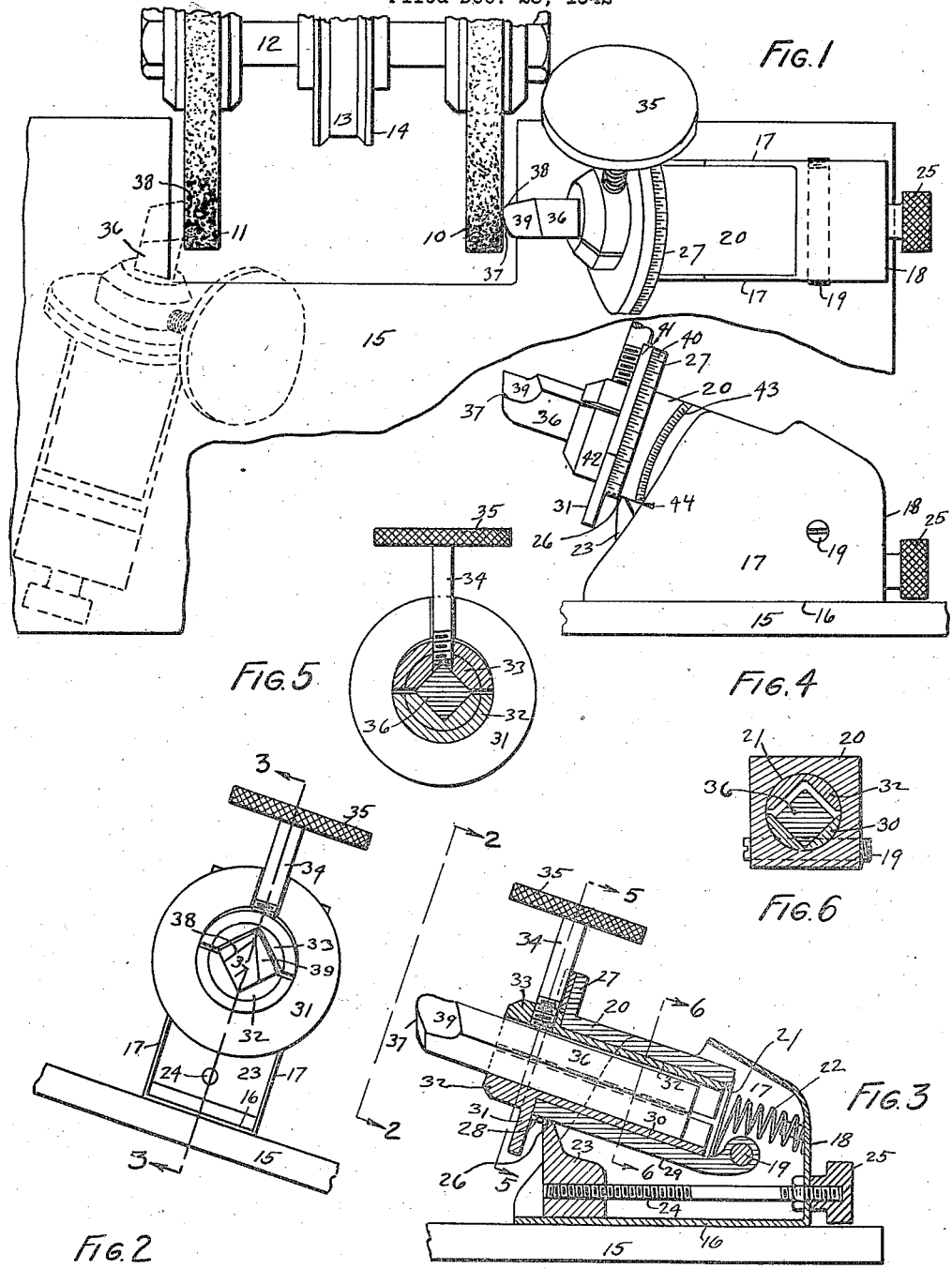
INVENTOR.
LOUIS H. HOWE.
BY ...
ATTORNEY.

Patented Dec. 26, 1944

2,365,759

UNITED STATES PATENT OFFICE 2,365,759

LATHE AND SHAPER TOOL BIT GRINDING GAUGE

Louis H. Howe, Portland, Oreg.

Application December 23, 1942, Serial No. 469,923

4 Claims. (Cl. 51—221)

This invention relates generally to machine tools and particularly to the grinding of toolbits.

The main object of this invention is to simplify the sharpening of lathe, shaper and planer toolbits.

The second object is to so sharpen a bit as to make it hold its cutting edge as long as possible, to improve the quality and increase the quantity of the work performed thereby and to reduce the amount of time ordinarily spent in sharpening bits as well as to reduce the waste of steel caused by incorrect sharpening.

The third object is to provide an improved clamping action for holding bits of various sizes.

I accomplish these and other objects in the manner set forth in the following specification as illustrated in the accompanying drawing, in which:

Fig. 1 is a fragmentary plan of a double wheel grinder showing the relation of the gauge and the grinding wheels while grinding the clearance angles on a bit.

Figure 2 is an end elevation of the gauge taken along the line 2—2 in Fig. 3.

Figure 3 is a vertical section taken along the line 3—3 in Fig. 2.

Figure 4 is a side elevation of the gauge.

Figure 5 is a transverse section taken along the line 5—5 in Fig. 3.

Figure 6 is a transverse section taken along the line 6—6 in Fig. 3.

Similar numerals refer to similar parts throughout the several views.

Referring in detail to the drawing, there is shown a common form of wheel grinder having two abrasive wheels 10 and 11 mounted on a spindle 12 and driven by a belt 13 which passes around the pulley 14. The table 15 is provided as a rest upon which the gauge is placed.

Referring to my invention, same consists of a base 16 having the parallel sides 17 which are joined by the end 18. Across the sides 17 is mounted the screw 19 on which is hinged the square arm 20 having the bore 21 extending therethrough. A spring 22 disposed between the end of the arm 20 and the end 17 tends to urge the free end of the arm 20 downwardly.

Resting upon the base 16 is a shoe 23 into which is threaded an adjusting screw 24 which is provided with a knurled head 25 at the end thereof which is remote from the shoe 23, which screw end journals in the end 17. The shoe 23 has its uppermost edge 26 contacting the under side 29 of the arm 20. The purpose of this construction is to make it possible to adjust the vertical angle of the arm 20 by turning the head 25.

The arm 20 has formed on the end remote from the screw 19 a somewhat circular flange 27 whose under edge 28 is flattened to conform to the under side 29 of the arm 20.

Within the bore 21 is a split bit holding sleeve whose lower portion 30 is integral with the circular flange 31. The end 32 of the sleeve portion 30 projects beyond the flange 31. The upper sleeve portion 32 also extends into the bore 21 and with the part 30 is free to turn and slide therein. The end 33 extends beyond the flange 31 as does the end of the sleeve part 30.

The portion 33 has threaded therethrough a clamping screw 34 which is provided with a knurled head 35.

There is also shown a representative form of bit having a square shank 36 showing the front clearance face 37, the side clearance face 38 and the slope 39.

The edge 40 of the flange 27 is calibrated in degrees and the edge 41 of the flange 31 is provided with a mark 42 which can be brought into register with the degree marks on the edge 40, thereby making it easily possible to set the sleeve parts 30 and 32 and the bit shank 36 which is placed therein at any desired angle in a plane normal to the axis of the bore 21, thereby establishing the side clearance.

The front clearance is determined by the calibrated arc 43 on the arm 20 and the coinciding mark 44 on the side 17. The adjustment is made by rotating the screw 24 which varies the angle of the arm 20.

Since the slope 39 is on a side of the shank 38 which is normal to the shank portions on which the side and end clearances are formed, it follows that if the calibrations on the flange 27 used for grinding the side clearance are to be used for grinding the slope, then the bit shank 36 must be turned 90 degrees in its holder.

It will be noted that when the screw 34 is tightened, the bit shank 36 is forced against the lower sleeve portion 30, while the upper sleeve portion 32 is forced in the opposite direction thereby clamping the bit 36 and the parts 30 and 32 to the arm 20. As illustrated in Fig. 1, the front clearance is ground on wheel 10 and the side clearance is ground on wheel 11. The slope is ground on wheel 10. Obviously the conditions are reversed for right and left hand bits.

It can be seen that with this gauge, a bit can be properly ground by an inexperienced person, using the least time and material and at the same time producing the correct clearance and slope angles thereby making the tool last longer and turning out more and better work while in use.

I claim:

1. A gauge of the class described including a base adapted to slide in any direction on a flat tool rest, an arm hinged on said base, means for adjusting the angular relationship of said arm and base, a split sleeve rotatably mounted in said arm having a square opening between the portions thereof adapted to receive a bit, said sleeve portions extending from said arm and a clamping screw threaded through one of the extending sleeve portions adapted to engage a bit held therein and force the sleeve portions into engagement with said arm for the purpose of clamping the bit with relation thereto.

2. A gauge consisting of a channel shaped base having an arm hinged therein, a shoe mounted for sliding movement on said base under said arm adapted to limit its downward movement a degree scale and marker between said arm and base, a split sleeve rotatably mounted in said arm, the sleeve portions having square grooves formed in adjacent faces, together forming a square opening for a bit and a screw threaded through one sleeve portion and engaging said bit.

3. A tool holder and grinding gauge consisting of a flat base adapted to slide in any horizontal direction on a flat tool rest, an arm hinged on said base on a horizontal axis, means for clamping said arm in a predetermined position, said arm having a cylindrical bore extending longitudinally therethrough, a long split sleeve rotatably mounted in said bore, one portion of said split sleeve having a clamping screw extending therethrough normal to its axis adapted to hold a tool bit against one side of the sleeve and to urge the two portions of the sleeve apart into a clamping relationship with the bore of said arm.

4. In a device of the class described a combination of a horizontal table constituting a tool rest having a fixed relation to the grinding wheel, a gauge having a flat base adapted to rest on said table and to be slidably moveable thereon in any direction, an arm hinged on said base on a horizontal axis, means for fixing said arm at a predetermined angle of inclination, said arm having a longitudinal bore formed therethrough, said bore having disposed therein a longitudinally split sleeve the two portions of which contain right angled grooves whereby the two sleeves present a substantially square opening between same, one of said sleeves having a clamping screw extending normally therethrough into said square opening whereby the bit may be held against one of said sleeves and the two sleeves urged apart into a clamping relationship with said bore.

LOUIS H. HOWE.